United States Patent
Jha et al.

(10) Patent No.: US 8,082,313 B2
(45) Date of Patent: Dec. 20, 2011

(54) EFFICIENT UTILIZATION OF READ-AHEAD BUFFER BY PARTITIONING READ-AHEAD BUFFER IN CORRESPONDENCE WITH SELECTORS

(75) Inventors: Ruchir P. Jha, Gujarat (IN); Sujeet Mishra, Bangalore (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 12/606,032

(22) Filed: Oct. 26, 2009

(65) Prior Publication Data
US 2011/0099234 A1   Apr. 28, 2011

(51) Int. Cl.
*G06F 15/16*   (2006.01)
*G06F 13/00*   (2006.01)

(52) U.S. Cl. .................... 709/206; 709/246; 711/137

(58) Field of Classification Search ............. 707/999.01, 707/E17.017, E17.12; 709/206, 217–218, 709/220, 223, 246; 711/118, 129, 137
See application file for complete search history.

(56) References Cited

U.S. PATENT DOCUMENTS

| | | | |
|---|---|---|---|
| 6,385,624 B1* | 5/2002 | Shinkai ........................... | 1/1 |
| 7,127,507 B1* | 10/2006 | Clark et al. .................... | 709/224 |
| 7,333,616 B1* | 2/2008 | Brettle et al. ................. | 380/277 |
| 2002/0046294 A1* | 4/2002 | Brodsky et al. .............. | 709/246 |
| 2002/0123966 A1* | 9/2002 | Chu et al. ........................ | 705/43 |
| 2005/0044197 A1* | 2/2005 | Lai ................................. | 709/223 |
| 2006/0026162 A1* | 2/2006 | Salmonsen et al. ............. | 707/10 |
| 2007/0143545 A1 | 6/2007 | Conley et al. | |
| 2008/0140937 A1 | 6/2008 | Nalawade et al. | |
| 2009/0018996 A1* | 1/2009 | Hunt et al. ....................... | 707/2 |
| 2009/0276771 A1* | 11/2009 | Nickolov et al. ............. | 717/177 |

FOREIGN PATENT DOCUMENTS

| | | |
|---|---|---|
| EP | 0 682 833 B1 | 11/1995 |
| JP | 2000330923 A2 | 5/1999 |

\* cited by examiner

*Primary Examiner* — Peling Shaw

(57) ABSTRACT

A server computing device receives an update message from a client computing device at which a read-ahead buffer has been partitioned into partitions corresponding to selectors. The selectors correspond to different types of the messages of interest to be consumed by a given consuming application running on the client computing device. The update message specifies a given partition of the read-ahead buffer that requires filling with new messages matching the selector of the given partition. The server computing device sends the new messages requested in the update message to the client computing device, to fill the given partition of the read-ahead buffer at the client computing device.

20 Claims, 4 Drawing Sheets

EFFICIENT UTILIZATION OF READ-AHEAD BUFFER BY PARTITIONING READ-AHEAD BUFFER IN CORRESPONDENCE WITH SELECTORS

BACKGROUND

The present invention relates generally to read-ahead buffers, and more particularly to read-ahead buffers that have been partitioned.

In typical computing system architectures, a server computing device sends messages to a client computing device, at which the messages are consumed by consuming applications. One approach by which messages are sent from the server computing device to the client computing device is for the latter to request messages on a message-by-message basis from the former. In another approach, a read-ahead buffer is employed at the client computing device. Messages are periodically sent, typically in bunches, from the server computing device to the client computing device to fill the read-ahead buffer. The consuming applications then consume the messages from the read-ahead buffer. This latter approach is different than the former approach in that messages are sent from the server computing device to the client computing device in bunches, as opposed to individually on a message-by-message basis as in the former approach.

BRIEF SUMMARY

A method of an embodiment of the invention receives, by a server computing device, an update message from a client computing device at which a read-ahead buffer has been partitioned into a number of a partitions corresponding to a number of selectors. The selectors correspond to different types of the messages of interest to be consumed by a given consuming application running on the client computing device. The update message specifies a given partition of the read-ahead buffer that requires filling with new messages matching the selector of the given partition. The method sends the new messages requested in the update message, from the server computing device to the client computing device, to fill the given partition of the read-ahead buffer at the client computing device.

A method of another embodiment of the invention partitions a read-ahead buffer at a client computing device into a number of partitions corresponding to a number of selectors. The selectors correspond to different types of the messages of interest to be consumed by a given consuming application running on the client computing device. The method sends an update message from the client computing device to a server computing device. The update message specifies a given partition of the read-ahead buffer that requires filling with new messages matching the selector of the given partition. The method receives the new messages requested in the update message, by the client computing device from the server computing device, to fill the given partition of the read-ahead buffer at the client computing device.

A client computing device of an embodiment of the invention includes a processor, a computer-readable storage medium, a network adapter, a read-ahead buffer, a consuming application, and a buffer manager. The network adapter is to communicatively couple the client computing device to a server computing device. The read-ahead buffer is to be stored on the computer-readable storage medium and is partitioned into a number of partitions corresponding to a number of selectors. The selectors correspond to different types of messages of interest, each partition of the read-ahead buffer to store messages matching the selector to which the partition corresponds. The consuming application is stored on the computer-readable storage medium and is executable by the processor. The consuming application is to consume the messages from the partitions of the read-ahead buffer such that the messages are emptied from the read-ahead buffer upon being consumed. The buffer manager is stored on the computer-readable storage medium and is executable by the processor. The buffer manager is to periodically send an update message to the server computing device to receive new messages from the server computing device. The update message specifies a given partition of the read-ahead buffer that requires filling with the new messages matching the selector of the given partition.

A computer program product of an embodiment of the invention includes a computer-readable storage medium having computer-readable program code embodied therein. The computer-readable program code includes computer-readable program code configured to partition a read-ahead buffer at a client computing device into a number of partitions corresponding to a number of selectors. The selectors correspond to different types of the messages of interest to be consumed by a given consuming application running on the client computing device. The computer-readable program code further includes computer-readable program code configured to send an update message to the server computing device. The update message specifies a given partition of the read-ahead buffer that requires filling with new messages matching the selector of the given partition. The update message further specifies an extent to which the given partition needs to be filled. The computer-readable program code also includes computer-readable program code configured to receive the new messages requested in the update message, from the server computing device, to fill the given partition of the read-ahead buffer.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

Utilizing a read-ahead buffer at a client computing device is efficient because, as noted in the background, messages can be sent in bunches from a server computing device, instead of having to be requested individually on a message-by-message basis as the messages are needed. Nevertheless, utilizing a read-ahead buffer can introduce other inefficiencies in the consumption of messages. These inefficiencies result from the fact that different types of messages may be consumed at different rates by consuming applications running on the client computing device.

For example, consider a simple situation in which there are two types of messages. Initially the read-ahead buffer is completely filled with messages of the first type. However, a consuming application may need to consume (i.e., process) messages of the second type. In this situation, the consuming application has to wait until at least some of the messages of the first type are consumed from the read-ahead buffer, and also hope that the messages sent by the server computing device to replenish the buffer are of the second type. If consumption of the messages of the first type from the read-ahead buffer is slow, and/or if the buffer is replenished by the server computing device with new messages of the first type, the consuming application is starved of the messages of the second type that it needs.

Figure 1:
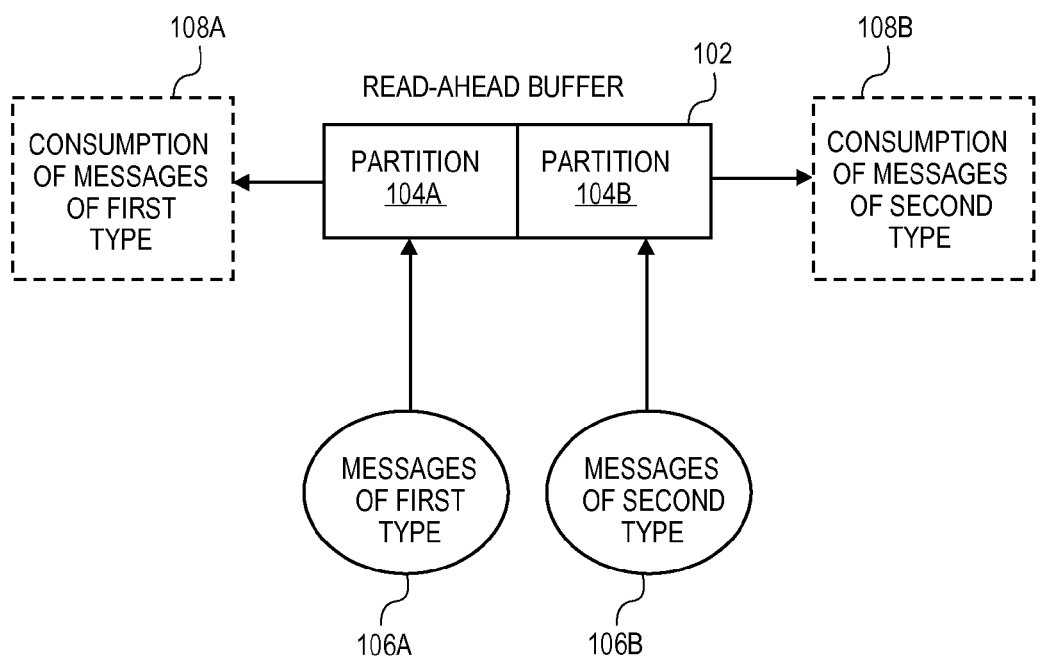
FIG. 1 is a diagram depicting representative operation of a partitioned read-ahead buffer, according to an embodiment of the invention.

FIG. 1 shows the representative operation of a partitioned read-ahead buffer 102, according to an embodiment of the invention. The read-ahead buffer 102 is partitioned in the example of FIG. 1 into two partitions 104A and 104B, collectively referred to as the partitions 104. The partition 104A of the read-ahead buffer 102 is reserved for messages of the first type 106A, whereas the partition 104B of the buffer 102 is reserved for messages of the second type 106B. That is, the partition 104A temporarily stores messages of the first type 106A, and only messages of the first type 106A in one embodiment. By comparison, the partition 104B temporarily stores messages of the second type 106B, and only messages of the second type 106B in one embodiment.

The messages of the first type 106A are consumed from the partition 104A of the read-ahead buffer 102 as indicated by the dotted-line box 108A, whereas the messages of the second type 106B are consumed from the partition 104B of the buffer 102 as indicated by the dotted-line box 108B. When periodic replenishment of the read-ahead buffer 102 is requested, new messages of the first type 106A refill the partition 104A, and new messages of the second type 106B refill the partition 104B. As such, a consuming application does not have to worry that the read-ahead buffer 102 is completely filled with an unwanted type of messages, and does not have to wait for the buffer 102 to become filled with at least some messages of the desired type.

For instance, consider the example described previously, in which a consuming application wants messages of the second type 106B. This consuming application immediately is able to consume messages of the second type 106B from the read-ahead buffer 102, because the partition 104B has been reserved for messages of the second type 106B. As such, the consuming application does not have to wait for messages of the first type 106A to be consumed from the read-ahead buffer 102 before messages of the second type 106B populated the buffer 102.

Furthermore, continuing with this example, when the read-ahead buffer 102 is periodically replenished, the partition 104B will be refilled with new messages of the second type 106B. As such, the consuming application in question does not have to be concerned that the read-ahead buffer 102 will be refilled only with messages of the first type 106A. This is because the partition 104B is reserved for messages of the second type 106B. Insofar as there are any messages of the second type at the server computing device from replenishment of the read-ahead buffer 102 at the client computing device is achieved, the consuming application knows that the partition 104B will be replenished with such messages of the second type.

Figure 2:
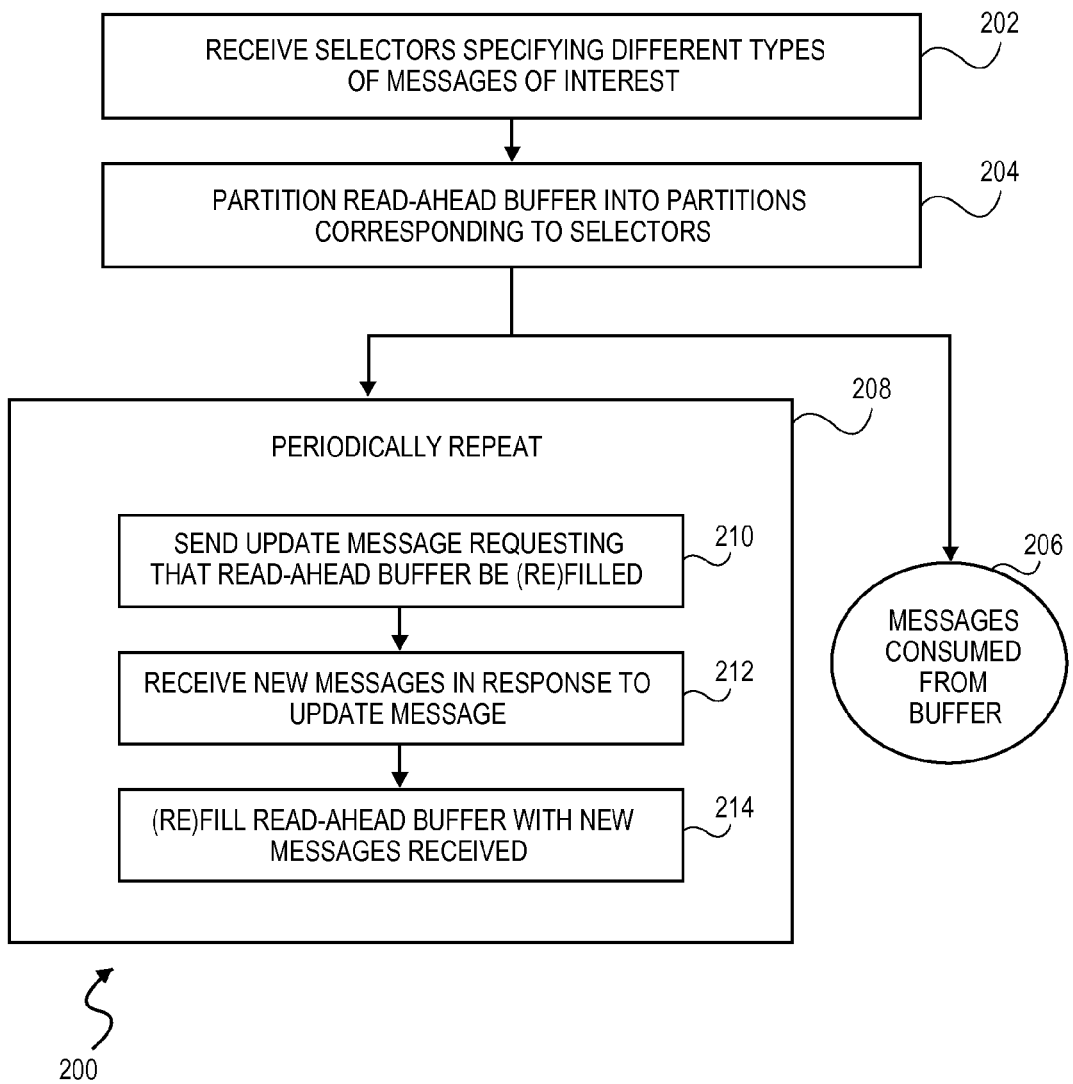
FIG. 2 is a flowchart of a method for efficiently utilizing a read-ahead buffer by partitioning the read-ahead buffer, according to an embodiment of the invention.

FIG. 2 shows a method 200 for such efficient utilization of a read-ahead buffer, according to an embodiment of the invention. The method may be implemented as one or more computer programs stored on one or more computer-readable media. Examples of such computer-readable media include recordable data storage media like volatile and non-volatile semiconductor memory, hard disk drives and other magnetic media, and so on. The computer programs are executed by one or more processors from the computer-readable media to perform the method 200.

A client computing device receives selectors from a consuming application running on the client computing device (202). The selectors specify the different types of messages of interest that the consuming application will consume. For example, the selectors may be specified as a logical statement (A OR B OR C OR . . . Y OR Z), where A, B, C, . . . , Y, and Z each specifies a different type of message of interest. The client computing device in response partitions the read-ahead buffer into partitions corresponding to the selectors (204). In one embodiment, the partitions are of equal size, but in another embodiment, the partitions may vary in size in correspondence with the expected number and/or size of the messages of the various types to which the selectors correspond.

It is noted that the specification of the selectors can be static, such that the partitioning of the read-ahead buffer into different partitions corresponding to the selectors is also static. This means that the read-ahead buffer is partitioned just once, at runtime of the consuming application. Thereafter, the read-ahead buffer is not repartitioned. Thus, partitioning of the read-ahead buffer is achieved based upon the knowledge of the types of messages, and hence the types of selectors, that the consuming application expects to consuming while running on the client computing device.

Once the read-ahead buffer has been partitioned, two separate tracks are continually performed in parallel with one another. First, messages are consumed from the read-ahead buffer (206). That is, the consuming application consumes the messages of the different types to which the selectors correspond, from the partitions of the read-ahead buffer. As such, the partitions of the read-ahead buffer are emptied as the consuming application consumes the messages of the different types to which the partitions correspond.

It is noted that consumption of the messages by the consuming application from the partitions of the read-ahead buffer can be dynamic. That is, the order in which the consuming application consumes the messages of the different types from among the partitions of the read-ahead buffer can vary, and is not specified at runtime. For instance, the consuming application may first consume many messages of the first type before consuming messages of the second type, or it may consume messages of the second type before consuming messages of the first type. Note that such dynamic message consumption is in comparison to the static selector specification on which basis the read-ahead buffer is partitioned into partitions.

Substantially in parallel with messages being consumed from the read-ahead buffer, the client computing device periodically repeats—i.e., at varying intervals and/or as needed—the following (208). First, the client computing device sends an update message to the server computing device requesting that the read-ahead buffer be (re)filled (210). The server computing device is responsible for sending messages to the client computing device so that the client computing device can (re)fill the read-ahead buffer.

The update message specifies the given partition of the read-ahead buffer that requires (re)filling with new messages of the type matching the selector of the given partition. The update message also specifies the extent to which the given partition needs to be (re)filled. For instance, the extent to which the given partition needs to be (re)filled may be specified within the update message as a percentage of the read-ahead buffer that is now empty as a result of the consuming application consuming the messages matching the selector of the given partition from the buffer.

The client computing device receives new messages to (re)fill the read-ahead buffer from the server computing device (212). The new messages may correspond in number and/or size to the percentage of the read-ahead buffer that is now empty, as may be specified by the update message. For example, if all messages are of at least substantially the same size, then the number of messages received may correspond to the percentage of the buffer specified within the update message. By comparison, if the messages are of different sizes, then the size of the messages received in total may correspond to the percentage of the buffer specified within the update message.

The client computing device then (re)fills the read-ahead buffer with the new messages that have been received (214). More specifically, the partitions of the read-ahead buffer are (re)filled with messages of the types to which the selectors of the partitions correspond. For example, a partition corresponding to a selector that corresponds to messages of a first type are (re)filled with received messages of the first type, a partition corresponding to a selector that corresponds to messages of a second type are (re)filled with received messages of the second type, and so on. As such, a partition is (re)filled only with messages of the type to which the selector of the partition corresponds.

Figure 3:
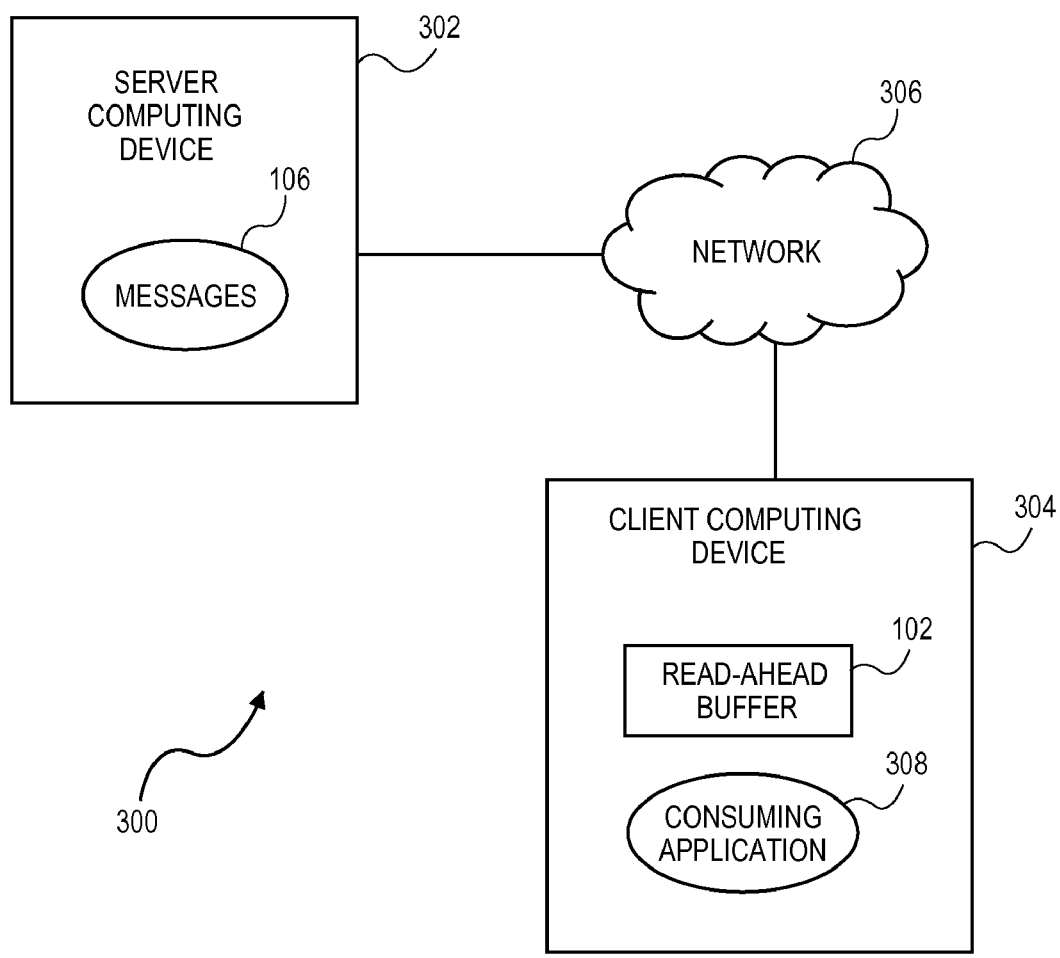
FIG. 3 is a diagram of a system having a partitioned read-ahead buffer, according to an embodiment of the invention.

FIG. 3 shows a representative system 300, according to an embodiment of the invention. The system 300 includes a server computing device 302 and a client computing device 304. The computing devices 302 and 304 are interconnected to one another by a network 306. Each of the computing devices 302 and 304 typically includes hardware such as memory, processors, storage devices like hard disk drives, and other types of hardware. The network 306 may be or include local-area networks (LAN's), wide-area networks (WAN's), the Internet, intranets, extranets, wireless networks, and wired networks, among other types of networks.

The server computing device 302 initially stores the messages 106. The client computing device 304 includes the partitioned read-ahead buffer 102 that has been described, as well as a consuming application 308. There may be more than one consuming application. A consuming application is generally one that consumes, or processes, the messages 106.

In general, a message is a data object of communication. Thus, a message is information that is sent from a sender to a receiver. A message generally includes a header that specifies properties, as well as a body that specifies the data itself that is being sent. Examples of messages include files, events, requests, responses, and so on. Furthermore, examples of consuming applications include application computer programs that receive messages from a server, such as message-driven bean programs, servlets, stand-alone computer programs, and other types of computer programs.

In general operation of the system 300, the server computing device 302 is responsible for sending the messages 106 to the client computing device 304 over the network 306, in response to update requests from the client computing device 304. As such, the client computing device 304 receives the messages 106 sent by the server computing device 302. The read-ahead buffer 102 is partitioned into partitions corresponding to selectors, where the selectors correspond to different types of messages of interest to the consuming application 308. Each partition stores messages matching the selector to which it corresponds.

The client computing device 304 repeatedly and periodically sends update messages to the server computing device 302, which are not to be confused with the messages 106 that the server computing device 302 sends and that are consumed by the consuming application 308. An update message is sent by the client computing device 304 to indicate that the server computing device 302 is to send additional messages 106 to the client computing device 304 to (re)fill the read-ahead buffer 102. As has been described, an update message specifies a given partition of the read-ahead buffer 102 that requires (re)filling with new messages matching the selector of the given partition, and also specifies the extent to which the given partition needs to be filled.

The consuming application 308 runs on the client computing device 304, and consumes the messages from the partitions of the read-ahead buffer 102 such that the messages are emptied or removed from the buffer 102 as the messages are consumed. The consuming application 308 may a priori provide to the client computing device 304 the selectors specifying the different types of messages of interest that it will consume, such that the read-ahead buffer 102 is partitioned in correspondence with these provided selectors. As has been noted above, the selectors are static such that partitioning of the read-ahead buffer 102 is static, whereas consumption of the messages 106 by the consuming application 308 is dynamic.

Figure 4:
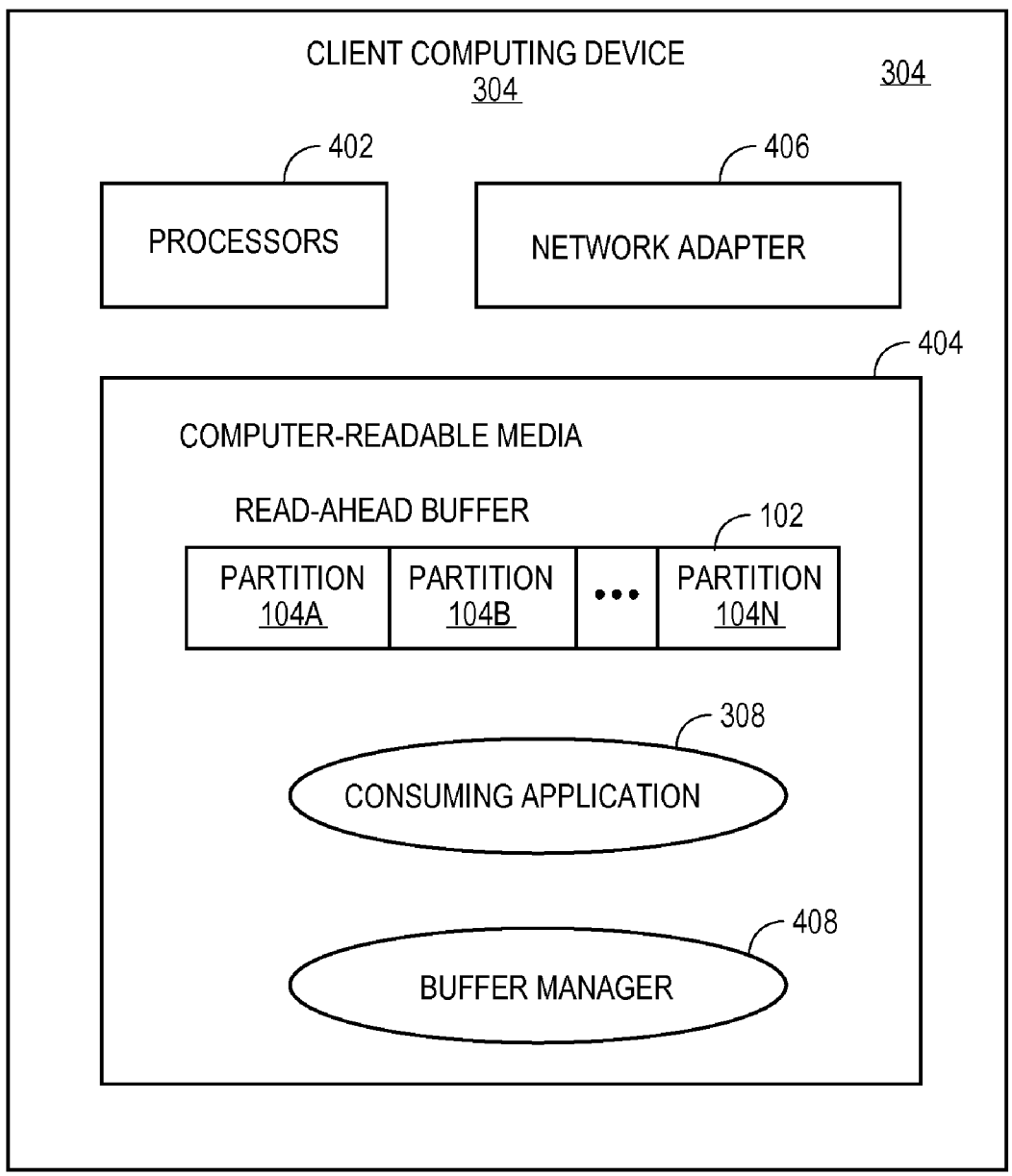
FIG. 4 is a diagram of a representative client computing device having a partitioned read-ahead buffer, according to an embodiment of the invention.

FIG. 4 shows the client computing device 304 in representative detail, according to an embodiment of the invention. The client computing device includes one or more processors 402, one or more computer-readable media 404, and a network adapter 406, all of which are considered hardware. The client computing device may further and typically include other hardware, in addition to the processors 402, the computer-readable media 404, and the network adapter 406.

Examples of computer-readable media 404 include volatile and non-volatile semiconductor memory, as well as magnetic media like hard disk drives. The network adapter 406 is considered a general hardware component that permits the client computing device 304 to communicate with the server computing device 302 over the network 306 in FIG. 3. Examples of network adapters include wired and wireless Ethernet and other types of adapters, which may be discretely implemented as hardware cards inserted into the client computing device 304, or as built-in functionality of the motherboard or another component of the client computing device 304, for instance.

The computer-readable media 404 stores or implements the read-ahead buffer 102 that has been discussed, as well as the consuming application 308 and the buffer manager 408, the latter two as one or more computer programs each. The read-ahead buffer 102 is partitionable into a number of partitions 104A, 104B, . . . , 104N, collectively referred to as the partitions 104, and which correspond to the selectors that themselves correspond to different types of messages of interest. As such, each of the partitions 104 stores (only) messages matching the selector to which the partition in question corresponds.

The consuming application 308 and the buffer manager 408 are executable by the processors 402. As has been described, the consuming application 308 consumes messages from the partitions 104 of the read-ahead buffer 102, such that the messages are emptied or removed from the read-ahead buffer 102 upon being consumed. The buffer manager 408 repeatedly and periodically sends update messages to the server computing device 302 of FIG. 3 to receive new messages from the server computing device 302 to temporarily store within the partitions 104 of the read-ahead buffer 102, as has also been described.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
receiving, by a server computing device, an update message from a client computing device at which a read-ahead buffer has been partitioned into a plurality of a partitions corresponding to a plurality of selectors, the selectors corresponding to different types of the messages of interest to be consumed by a given consuming application running on the client computing device, the update message specifying a given partition of the read-ahead buffer that requires filling with new messages matching the selector of the given partition; and,
sending the new messages requested in the update message, from the server computing device to the client computing device, to fill the given partition of the read-ahead buffer at the client computing device.

2. The method of claim 1, wherein the update message further specifies an extent to which the given partition needs to be filled.

3. A method comprising:
partitioning a read-ahead buffer at a client computing device into a plurality of partitions corresponding to a plurality of selectors, the selectors corresponding to different types of the messages of interest to be consumed by a given consuming application running on the client computing device;
sending an update message from the client computing device to a server computing device, the update message specifying a given partition of the read-ahead buffer that requires filling with new messages matching the selector of the given partition; and,
receiving the new messages requested in the update message, by the client computing device from the server computing device, to fill the given partition of the read-ahead buffer at the client computing device.

4. The method of claim 3, further comprising receiving by the client computing device from the given consuming application the plurality of selectors specifying the different types of the messages of interest to be consumed by the given consuming application.

5. The method of claim 3, further comprising consuming the messages of the different types to which the selectors correspond, from the partitions of the read-ahead buffer and by the given consuming application, such that the read-ahead buffer is emptied as the given consuming application consumes the messages.

6. The method of claim 3, wherein the update message further specifies an extent to which the given partition needs to be filled, as a percentage of the read-ahead buffer that is now empty as a result of the given consuming application consuming the messages matching the selector of the given partition from the given partition of the read-ahead buffer.

7. The method of claim 6, wherein the new messages received by the client computing device from the server computing device correspond in one or more of number and size to the percentage of the read-ahead buffer that is now empty.

8. The method of claim 3, further comprising filling the given partition of the read-ahead buffer at the client computing device with the new messages received.

9. The method of claim 3, wherein the plurality of selectors in correspondence with which the read-ahead buffer is partitioned are static.

10. The method of claim 3, wherein consumption of the messages by the given consuming application from the partitions of the read-ahead buffer is dynamic.

11. A client computing device comprising:
a processor;
a computer-readable storage medium;
a network adapter to communicatively couple the client computing device to a server computing device;
a read-ahead buffer to be stored on the computer-readable storage medium and partitioned into a plurality of partitions corresponding to a plurality of selectors, the selectors corresponding to different types of messages of interest, each partition of the read-ahead buffer to store messages matching the selector to which the partition corresponds;
a consuming application stored on the computer-readable storage medium and executable by the processor, the consuming application to consume the messages from the partitions of the read-ahead buffer such that the messages are emptied from the read-ahead buffer upon being consumed; and,
a buffer manager stored on the computer-readable storage medium and executable by the processor, the buffer manager to periodically send an update message to the server computing device to receive new messages from the server computing device, the update message specifying a given partition of the read-ahead buffer that requires filling with the new messages matching the selector of the given partition.

12. The client computing device of claim 11, wherein the consuming application specifies the plurality of selectors corresponding to the different types of the messages of interest to be consumed by the consuming application.

13. The client computing device of claim 11, wherein the update message further specifies an extent to which the given partition needs to be filled.

14. The client computing device of claim 13, wherein the extent to which the given partition needs to be filled is specified within the update message as a percentage of the read-ahead buffer that is now empty as a result of the consuming application consuming the messages matching the selector of the given partition from the given partition of the read-ahead buffer.

15. The client computing device of claim 14, wherein the new messages received from the server computing device correspond in at least one of number and size to the percentage of the read-ahead buffer that is now empty.

16. The client computing device of claim 13, wherein the plurality of selectors in correspondence with which the read-ahead buffer is partitioned are static in that the read-ahead buffer is partitioned once at runtime and thereafter is not further repartitioned,
and wherein consumption of the messages by the consuming application from the partitions of the read-ahead buffer is dynamic in that an order in which the given consuming application is to consume the messages from among the partitions of the read-ahead buffer varies and is not specified at runtime.

17. A computer program product comprising:
a computer-readable storage medium having computer-readable program code embodied therein, the computer-readable program code comprising:
   computer-readable program code configured to partition a read-ahead buffer at a client computing device into a plurality of partitions corresponding to a plurality of selectors, the selectors corresponding to different types of the messages of interest to be consumed by a given consuming application running on the client computing device;
   computer-readable program code configured to send an update message to the server computing device, the update message specifying a given partition of the read-ahead buffer that requires filling with new messages matching the selector of the given partition, the update message further specifying an extent to which the given partition needs to be filled; and,
   computer-readable program code configured to receive the new messages requested in the update message, from the server computing device, to fill the given partition of the read-ahead buffer.

18. The computer program product of claim 17, wherein the computer-readable program code configured to send the update message to the server computing device is to specify the extent to which the given partition needs to be filled within the update message as a percentage of the read-ahead buffer that is now empty as a result of the consuming application consuming the messages matching the selector of the given partition from the given partition of the read-ahead buffer.

19. The computer program product of claim 18, wherein computer-readable program code configured to receive the new messages requested in the update message is to receive the new messages from the server computing device in correspondence with at least one of number and size to the percentage of the read-ahead buffer that is now empty.

20. The computer program product of claim 17, wherein the computer-readable program code configured to partition the read-ahead buffer at the client computing device is to partition the plurality of selectors in correspondence with the read-ahead buffer statically in that the read-ahead buffer is partitioned once at runtime and thereafter is not further repartitioned.

* * * * *